United States Patent [19]
Sterett

[11] 4,345,510
[45] Aug. 24, 1982

[54] LOUVER ASSEMBLY

[75] Inventor: Robert A. Sterett, Jackson, Mich.

[73] Assignee: LOF Plastics Inc., Detroit, Mich.

[21] Appl. No.: 175,035

[22] Filed: Aug. 4, 1980

[51] Int. Cl.$^3$ ............................................. F24F 13/16
[52] U.S. Cl. ................................. 98/40 VM; 98/110;
                                                        98/114
[58] Field of Search .......... 98/2, 40 V, 40 VM, 41 R,
                                98/107, 110, 112, 114, 121 A

[56]         References Cited
        U.S. PATENT DOCUMENTS 2,735,351  2/1956  Abrahamsen ...................... 98/110 X
    3,735,691  5/1973  Gofton et al. .................... 98/40 V X
    3,833,989  9/1974  McCabe ............................ 98/110 X
    4,009,648  3/1977  Braden et al. ..................... 98/40 V

FOREIGN PATENT DOCUMENTS 1375823 11/1974 United Kingdom ............. 98/121 A

Primary Examiner—Albert J. Makay
Assistant Examiner—Harold Joyce
Attorney, Agent, or Firm—Collins, Oberlin & Darr

[57]             ABSTRACT

An apparatus for directing and regulating the flow of fluid from a conduit system. The apparatus includes a tubular housing for encasing a deflector body, the deflector body containing a cartridge having a plurality of spaced-apart, parallel, movable vanes. Each element of the assembly is integrally molded from a plastic material. The vanes of the cartridge are interconnected by a pair of diagonally disposed tie-bars which permit the vanes to move in unison relative thereto, and a detent system including the tie-bars for counteracting the memory of the integral connection between the tie-bars and the vanes thus holding the vanes in desired positions relative to the deflector body.

6 Claims, 6 Drawing Figures

LOUVER ASSEMBLY

BACKGROUND OF THE INVENTION

1. Field of the Invention

This invention generally relates to a louver assembly for directing and regulating the flow of fluid in a conduit system and, more particularly, to a louver outlet assembly adapted for controlling the volume and direction of fluid discharged through the louver assembly.

2. Description of the Prior Art

Various types of air outlet assemblies are used for regulating the flow of air in convection or forced air circulating systems. These are outlet assemblies, as used in automotive air conditioning systems, ganerally include a valve body and a louvered valve device which selectively cooperate to regulate the volume and direction of fluid flow through the outlet assembly.

Present day air outlet assemblies are comprised of numerous individually produced parts which require an excessive amount of manual labor in assembling the parts, thus substantially increasing the cost of the units.

SUMMARY OF THE INVENTION

Generally speaking, the improved louver assembly constructed in accordance with the invention overcomes the aforementioned disadvantages by providing a louver assembly comprised of only three component parts, each of which is molded from a plastic material, and which "snap" together in an assembled relationship. More particularly, the louver assembly comprises a tubular housing adapted to receive a deflector body which pivotally supports a unitary vane cartridge having a plurality of spaced-apart parallel vanes. A detent or friction system is provided between the deflector body and the vane cartridge for holding the vanes in desired positions.

OBJECTS AND ADVANTAGES

Accordingly, an object of this invention is to provide a novel air louver assembly which is constructed of a minimum number of parts, is easy to manufacture and assemble, and wherein some of the components are movable relative to others but yet mechanically locked in an assembled relationship.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
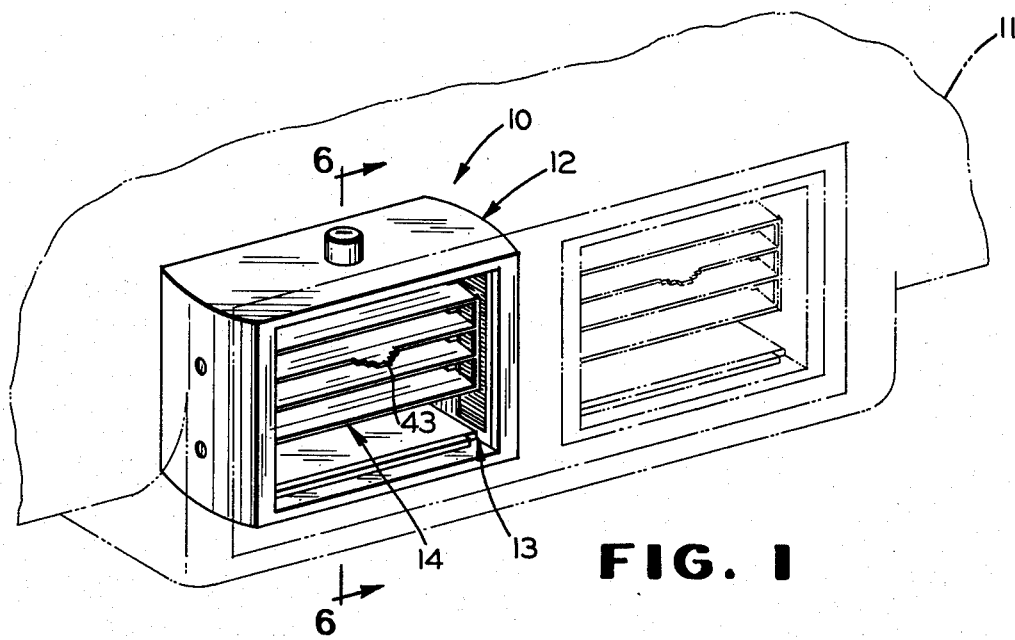
FIG. 1 is a perspective view illustrating a typical installation of a louver assembly embodying the invention.

Referring now to the drawings, particularly to FIG. 1, there is illustrated a louver assembly designated in its entirety by the reference numeral 10 which is adapted to be pivotally mounted in the dashboard 11 of an automative vehicle. Although the louver assembly 10 is designed for use in an automotive vehicle, it is to be understood that it may be employed in other environments such as refrigerators, home air conditioners or other appliances.

Figure 2:
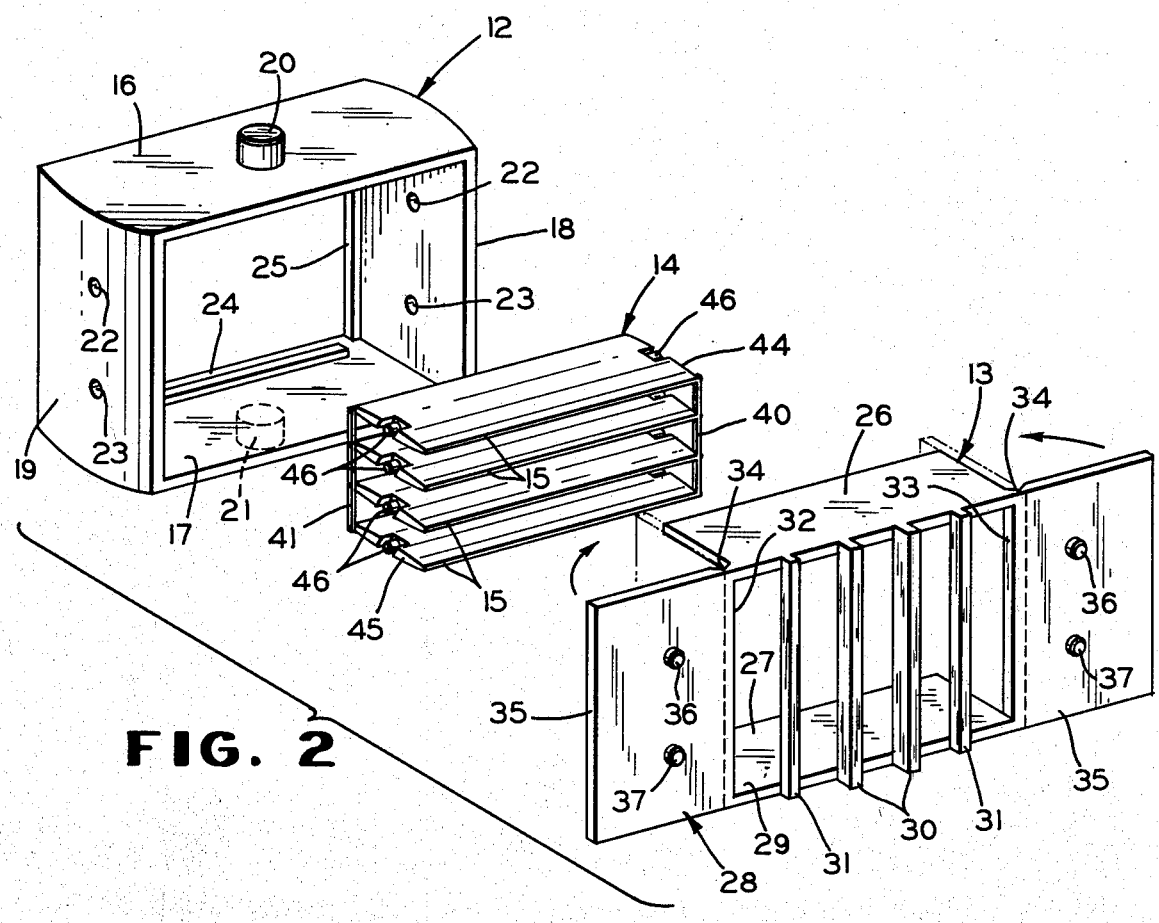
FIG. 2 is an enlarged exploded perspective view of the louver assembly illustrated in FIG. 1.

Referring now to FIG. 2, the louver assembly 10 generally comprises a tubular housing 12 which is adapted to receive a deflector body 13 which pivotally supports a vane cartridge 14 having a plurality of spaced-apart vanes or fins 15. Preferably, each of the aforementioned elements is integrally molded from a plastic material, the housing 12 being formed from a rigid plastic material while the deflector body 13 and vane cartridge 14 are formed from a resilient plastic material such as polypropylene or the like.

The tubular housing 12 is an open, generally rectangular frame having planar top and bottom walls 16 and 17, respectively, and side walls 18 and 19. The outer surfaces of the side walls 18 and 19 are arcuate in form, so as to permit pivoting movement of the assembly 10 in the dashboard 11 about pivot pins 20 and 21 projecting from the outer faces of the top and bottom walls 16 and 17, respectively. The inner faces of the side walls 18 and 19 are planar in form, the purpose of which will be described hereinafter. Also, each of the side walls 18 and 19 is provided with two apertures 22 and 23, the purpose of which will be described hereinafter.

Each of the inner faces of the top and bottom walls is provided with an upstanding rib 24 and each of the side walls is provided with an upstanding rib 25, the ribs serving as abutments against which the deflector body 13 bears for positioning it within the tubular housing 12.

Figures 3, 4, 5, 6:
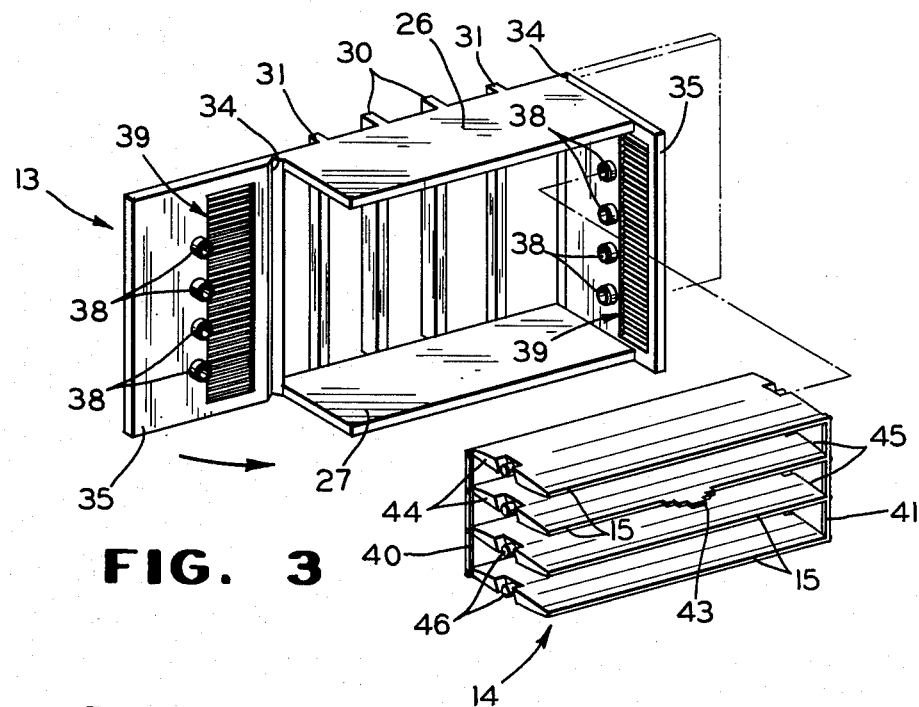
FIG. 3 is an enlarged exploded perspective view of the vane cartridge and air deflector employed in the louver assembly.
FIG. 4 is an enlarged fragmentary view of one embodiment of the vane cartridge employed in the louver assembly.
FIG. 5 is an enlarged fragmentary perspective view of a corner portion of another embodiment of the vane cartridge.
FIG. 6 is an enlarged cross sectional view taken substantially along line 6—6 in FIG. 1.

Referring now to FIGS. 2 and 3, the deflector body 13 is a generally rectangular, box-like member formed from a pattern having a U-shaped central section including top and bottom legs 26 and 27, respectively, extending from an elongated, generally rectangular planar portion 28. The planar portion 28 is provided with an open section 29. A plurality of vertically extending bars 30 and 31, extending between the base of the legs 26 and 27, bridge the open section 29 for encouraging the initial air flow to the louver assembly 10 along a straight path therethrough.

Each opposed side edge 32 and 33 defining the length of the open section 29 is provided with a living hinge 34, thus defining wing flanges 35 which fold inwardly against the edges of the legs 26 and 27 to form the box-like member. The outer face of each wing flange 35 is provided with a pair of studs 36 and 37 adapted to project into the apertures 22 and 23, respectively, of the tubular housing 12 for locking the deflector body 13 within the housing 12. The inner face of each wing flange 35 is provided with a plurality, in this instance four, spaced-apart aligned pivot seats 38 and an elongated detent system of rigid, parallel serrations 39 (see FIG. 3) for holding the vane cartridge in desired positions. However, it will be understood that other systems such as friction systems or the like may be employed in place of the serrated detent system shown.

Still referring to FIGS. 2 and 3, the vane cartridge 14 generally comprises a plurality, in this instance four, spaced-apart parallel vanes 15. The vanes 15 are held in this relationship by a pair of diagonally disposed, vertically extending tie-bars 40 and 41, one being disposed on opposite ends adjacent a corner of each vane. The corners of each vane 15 are integrally joined to their respective tie-bar 40 and 41 by "solid" connections (see FIG. 4), and because the tie-bars are slim, permit flexing movement of each vane relative thereto. However, if desired, the corners of each vane 15 may be integrally joined to their respective tie-bar 40 and 41 by living hinges 42 (see FIG. 5). One of the vanes 15 may be provided with protruding control handle 43 adapted to be grasped by an operator for positioning the vanes relative to the deflector body 13 with the vanes 15 being held in desired positions by the detent system.

Each end 44 and 45 of each vane 15 is provided with an inset pivot pin 46 which is adapted to project into the cooperating pivot seat 38 provided on the deflector body 13 for rotational movement of the vanes 15 relative to the deflector body and between fully open and fully closed positions as illustrated in FIG. 6.

As best illustrated in FIG. 4, the outer side face of each tie-bar 40 and 41 is provided with a plurality of raised protuberances 47, one preferably adjacent each vane 15. The protuberances 47 cooperate with the serrations 39 on the deflector body 13 to firmly hold the vanes 15 in a desired position by counteracting the memory of the illustrated "solid" or living hinge connections between the vanes and the tie-bars.

In assembling the louver assembly, the vane cartridge 14 is inserted between the legs 26 and 27 of the deflector body, with the tie-bars 40 and 41 adjacent the system of serrations 39. Each wing flange 35 is then folded inwardly to engage its pivot seats 38 with the adjacent vane pivot pin 46. This subassembly is then inserted into the outer housing 12 to bear against the ribs 24 and 25 at which points the studs 36 and 37 of the deflector body will project into the apertures 22 and 23, respectively, in the outer housing 12, thus locking the component parts in an assembled relationship.

It is to be understood that the form of the invention herewith shown and described is to be taken as an illustrative embodiment only of the same, and that various changes in the shape, size and arrangement of the parts may be resorted to without departing from the spirit of the invention.

I claim:

1. A louver assembly comprising a tubular housing having a generally rectangular interior passageway open at both ends and defined by top, bottom and end walls, a deflector body mounted within said tubular housing, said deflector body including a U-shaped central section with top and bottom legs extending normally from an elongated planar portion, and a wing at each end of said planar portion initially coplanar therewith and joined thereto by a living hinge and folded inwardly about said hinge against the ends of said legs forming a box-like member providing an open passageway through said housing, each said wing including a protuberance on its outer surface adapted to snap fit into a corresponding aperture in the adjacent end wall of said tubular housing upon insertion of said deflector body therein with said wings folded, and a vane cartridge mounted within said deflector body, said vane cartridge including a plurality of spaced-apart parallel vanes extending across said deflector body, each said vane being mounted at its ends to said wings of said deflector body by pivot pins received within cooperating pivot seats on the folded wings for pivotal movement about its longitudinal axis, and tie bars integrally formed with said vanes at a pair of diagonally opposite corners thereof interconnecting said vanes for movement in unison about their individual longitudinal axes within said deflector body to selectively direct air emerging from said louver or close off said passageway.

2. A louver assembly as claimed in claim 1 wherein said tie-bars are joined to each said vane by a "solid" connection.

3. A louver assembly as claimed in claim 1 wherein said tie-bars are joined to each said vane by a living hinge.

4. A louver assembly as claimed in claim 1 wherein one of said vanes includes a protruding control handle adapted to be grasped by an operator.

5. A louver assembly as claimed in claim 1, including a system for holding said vane cartridge in set positions relative to said deflector body.

6. A louver assembly as claimed in claim 5, wherein said holding system comprises an elongated series of parallel serrations provided on the interior surface of said wings and cooperating protuberances provided on said tie bars in engagement with said parallel serrations.

* * * * *

UNITED STATES PATENT AND TRADEMARK OFFICE
CERTIFICATE OF CORRECTION

PATENT NO. : 4,345,510

DATED : August 24, 1982

INVENTOR(S) : Robert A. Sterett

It is certified that error appears in the above-identified patent and that said Letters Patent are hereby corrected as shown below:

Col. 1, line 14, "are" should be --air--
       line 15, "ganerally" should be --generally--

Signed and Sealed this

Twenty-third Day of November 1982

[SEAL]

Attest:

GERALD J. MOSSINGHOFF

Attesting Officer    Commissioner of Patents and Trademarks